(12) United States Patent
Sato et al.

(10) Patent No.: US 8,736,915 B2
(45) Date of Patent: May 27, 2014

(54) IMAGE READING-RECORDING APPARATUS

(75) Inventors: Kuniaki Sato, Yokohama (JP); Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1461 days.

(21) Appl. No.: 11/760,315

(22) Filed: Jun. 8, 2007

(65) Prior Publication Data
US 2007/0285741 A1 Dec. 13, 2007

(30) Foreign Application Priority Data
Jun. 9, 2006 (JP) ................................. 2006-160715

(51) Int. Cl.
*H04N 1/04* (2006.01)
*H04N 1/00* (2006.01)

(52) U.S. Cl.
USPC ........... 358/474; 358/496; 358/497; 358/498; 358/401

(58) Field of Classification Search
USPC .......... 358/497, 496, 1.15, 1.1, 1.9, 474, 401, 358/505, 501, 498, 296; 399/110, 211, 212
See application file for complete search history.

(56) References Cited

U.S. PATENT DOCUMENTS

| 5,124,800 | A | * | 6/1992 | Hashimoto | 358/296 |
|---|---|---|---|---|---|
| 5,208,612 | A | * | 5/1993 | Obu et al. | 347/152 |
| 5,956,160 | A | * | 9/1999 | Watanabe | 358/496 |
| 6,185,010 | B1 | * | 2/2001 | Watanabe | 358/474 |
| 6,281,980 | B1 | * | 8/2001 | Maemura et al. | 358/1.14 |
| 6,462,839 | B1 | * | 10/2002 | Short | 358/474 |
| 7,016,088 | B2 | * | 3/2006 | Yokota et al. | 358/474 |
| 7,088,476 | B2 | | 8/2006 | Yokota et al. | |
| 7,202,983 | B2 | | 4/2007 | Yokota et al. | |
| 7,515,288 | B2 | * | 4/2009 | Nomura et al. | 358/1.15 |
| 7,605,954 | B2 | * | 10/2009 | Manabe et al. | 358/474 |
| 7,773,267 | B2 | * | 8/2010 | Kim et al. | 358/296 |
| 8,103,186 | B2 | * | 1/2012 | Andoh et al. | 399/110 |
| 8,279,495 | B2 | * | 10/2012 | Andoh et al. | 358/471 |
| 2007/0291328 | A1 | * | 12/2007 | Furihata et al. | 358/498 |

FOREIGN PATENT DOCUMENTS

| JP | 11-147347 | 6/1999 |
|---|---|---|
| JP | 2002-234179 | 8/2002 |
| JP | 2002-254670 | 9/2002 |
| JP | 2003-152923 | 5/2003 |

* cited by examiner

*Primary Examiner* — Cheukfan Lee
(74) *Attorney, Agent, or Firm* — Fitzpatrick, Cella, Harper & Scinto

(57) ABSTRACT

An image reading recording apparatus includes a recording unit for recording an image on a sheet and a read unit. The recording unit includes a feeding port for feeding the sheet. The read unit includes a frame and a reading portion which movably scans in the frame to read an original. The read unit is movable relative to the recording unit between a first position and a second position. In the first position, the feeding port of the recording unit is closed by the frame. In the second position, the feeding port is not closed by the frame. The recording unit includes a first sheet feeder and a second sheet feeder, such that when the sheet is in the first position, sheet feeding from the first sheet feeder is prohibited, and a sheet is fed from the second sheet feeder.

9 Claims, 6 Drawing Sheets

IMAGE READING-RECORDING APPARATUS

FIELD OF THE INVENTION AND RELATED ART

The present invention relates to an image reading-recording apparatus provided with a recording unit which records an image on recording medium, and a reading unit which reads the image on an original. In particular, it relates to an image reading-recording apparatus provided with such a reading unit that is movable relative to the recording unit of the image reading-recording apparatus.

An image reading-recording apparatus, such as a facsimile machine or a copying machine, has long been in use. An image reading-recording apparatus is provided with a reading unit which reads the image (characters, symbols, etc.) on an original, and a recording unit which records an image on recording medium, such as recording paper or plastic sheet, based on picture information. Generally, an image reading-recording apparatus is structured so that its recording unit is positioned below its reading unit.

Japanese Laid-open Patent Application 2003-152923, which shows one of the background technologies of the present invention, discloses an image reading-recording apparatus structured so that its reading unit is slidable relative to its recording unit to carry out maintenance operations, such as the operation for replacing the process cartridges and ink containers of the recording unit. Further, Japanese Laid-open Patent Application Hei 11-147347 discloses an image reading-recording apparatus structured so that the main assembly of its cover, which includes a control panel, is downwardly slidable to perform maintenance operations, such as the operation for dealing with paper jam or the operation for replacing components.

However, the structural arrangement disclosed in Japanese Laid-open Patent Application 2003-152923 did not lead to the improvement of the image reading-recording apparatus in terms of its operability in the ordinary operations to be carried out by a user, although it can be expected that the employment of the structural arrangement will improve an image reading-recording apparatus in maintainability, and also, will reduce the amount of space required to operate the apparatus. Further, the structural arrangement disclosed in Japanese Laid-open Patent Application Hei 11-147347 can improve an image reading-recording apparatus in maintainability, but it did not contribute to the reduction in the space required to operate the apparatus, and further, it is problematic in terms of the operability in the ordinary operations to be carried out by a user.

SUMMARY OF THE INVENTION

The primary object of the present invention is to provide an image reading-recording apparatus which is smaller in the amount of space required for its recording operation, and better in the operability in terms of the ordinary operations than an image reading-recording apparatus in accordance with the prior art.

According to an aspect of the present invention, there is provided an image reading recording apparatus comprising a recording unit for recording an image on a recording material; a read unit, movable relative to said recording unit, for reading an image on an original, said read unit being movable between a first position for closing a sheet feeding port of said recording unit and a second position for opening said sheet feeding port.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Figure 1:
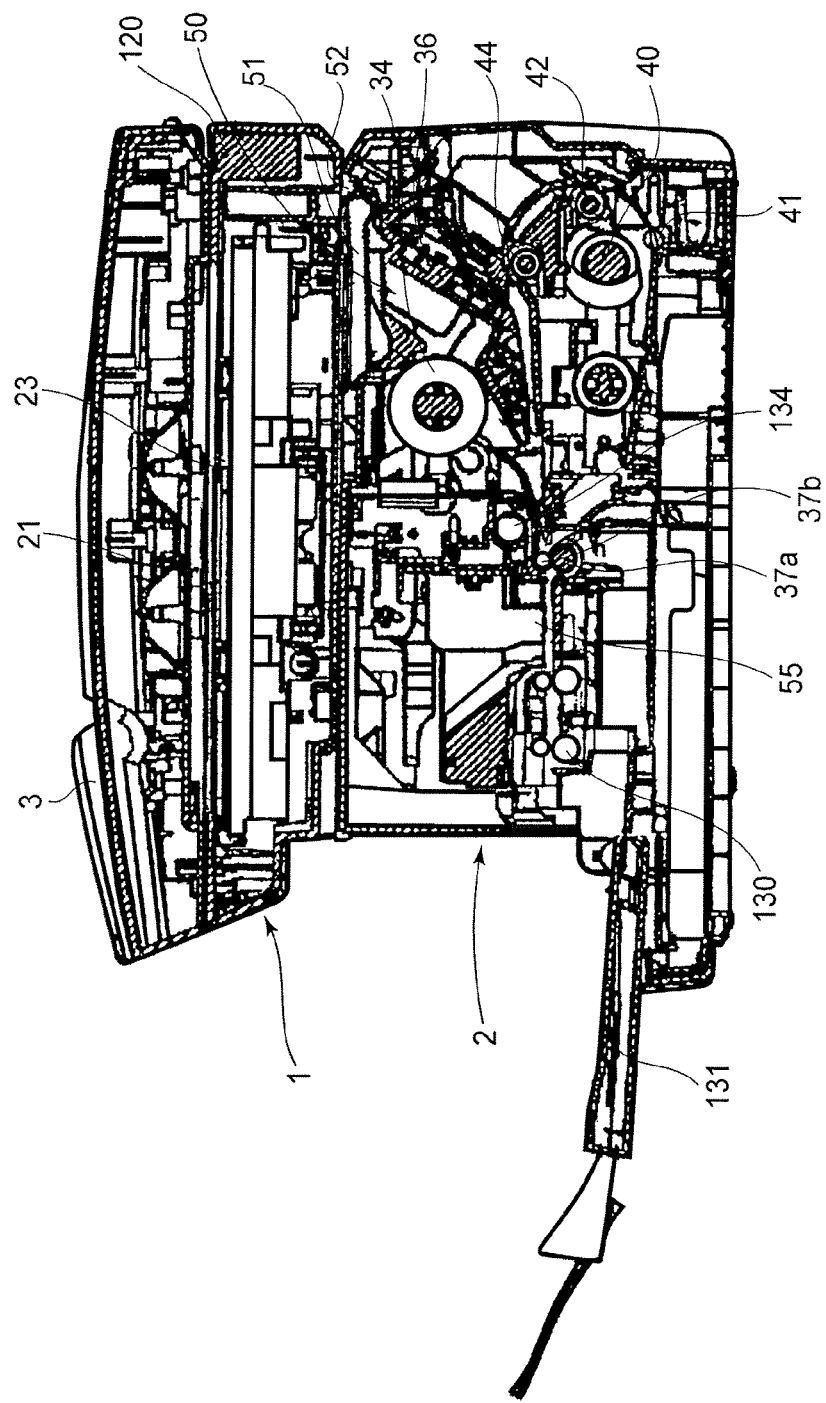
FIG. 1 is a vertical sectional view of the image reading-recording apparatus, in the first preferred embodiment of the present invention, which is in the state in which the reading unit of which is in its first position.
Figure 2:
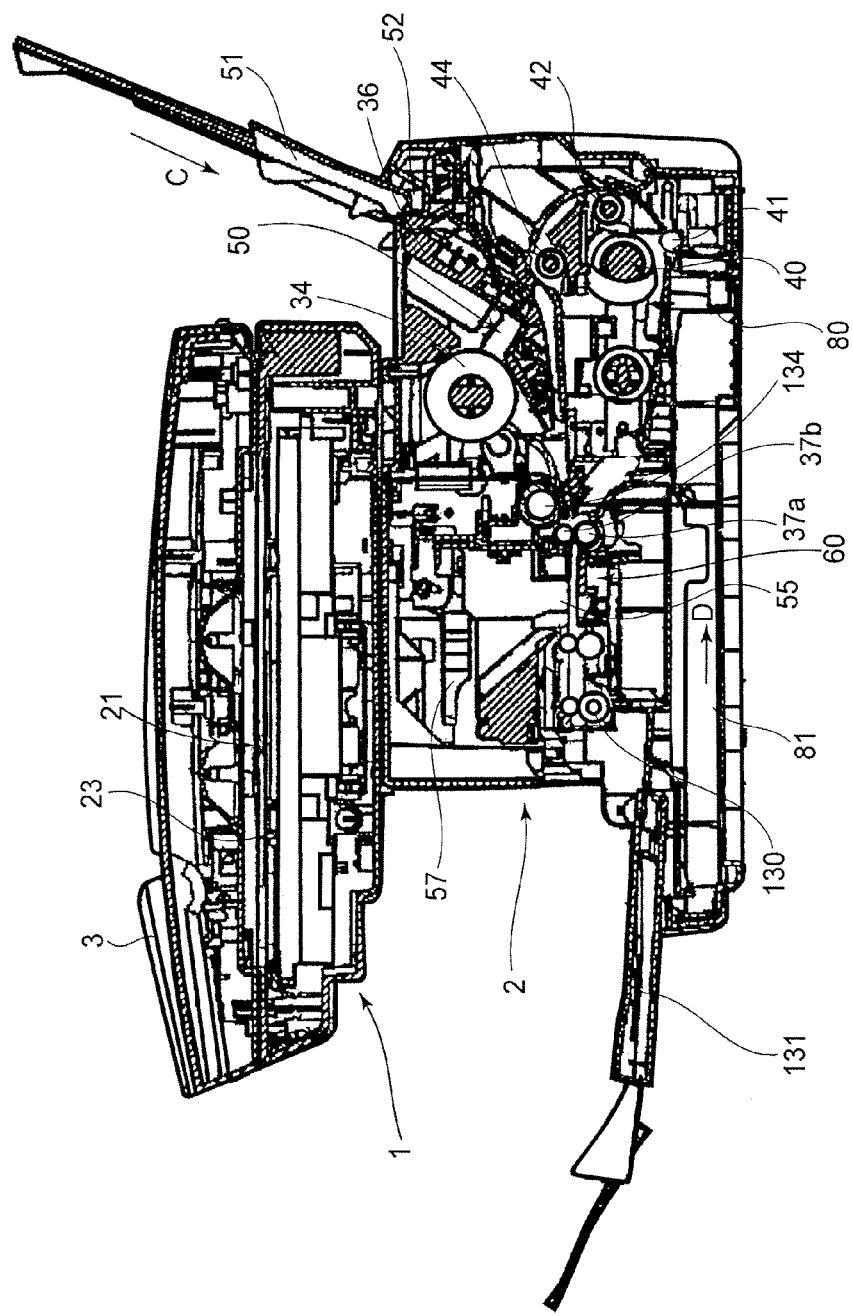
FIG. 2 is a vertical sectional view of the image reading-recording apparatus, in the first preferred embodiment of the present invention, which is in the state in which the reading unit of which is in its second position.
Figure 3:
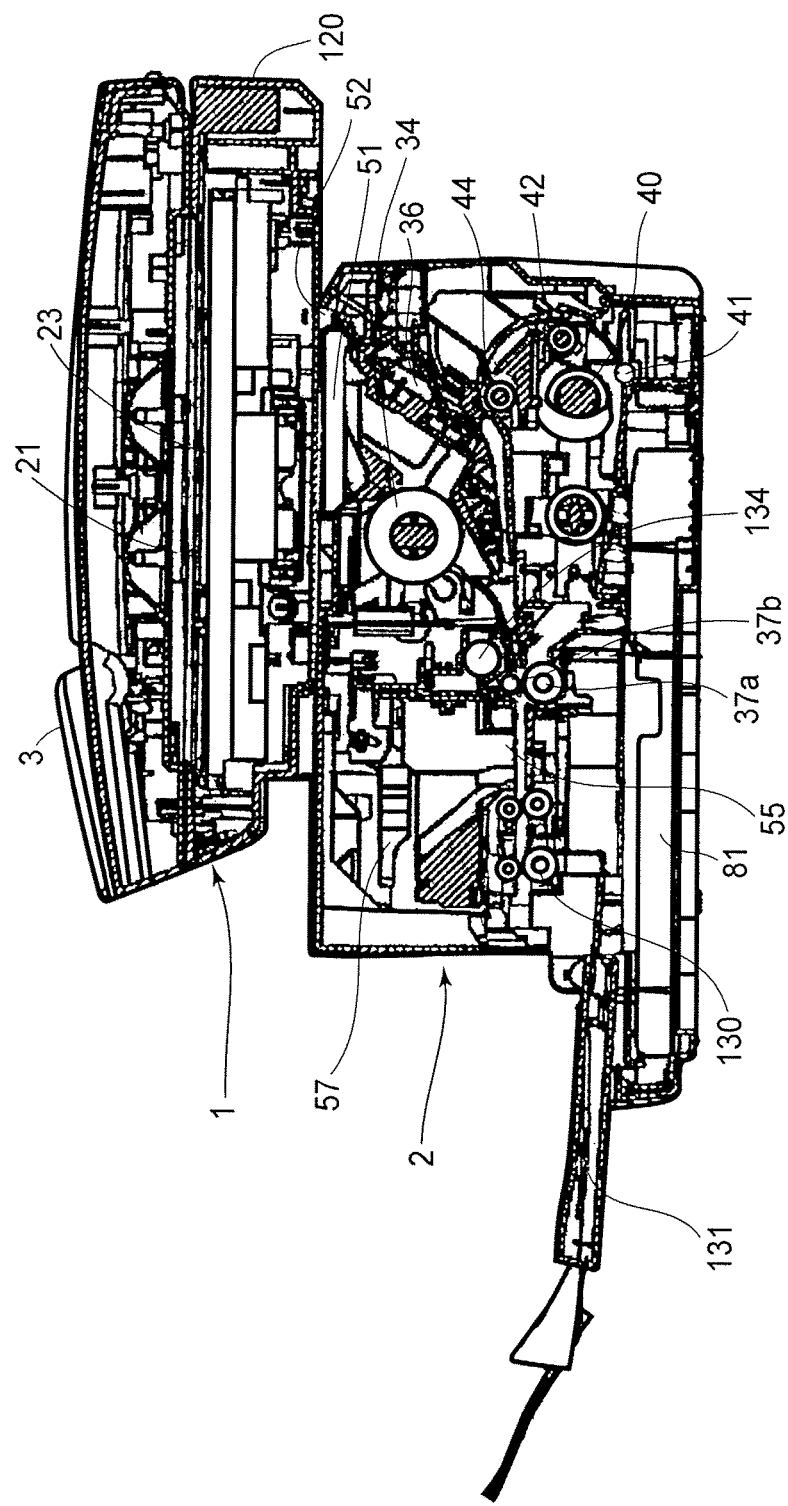
FIG. 3 is a vertical sectional view of the image reading-recording apparatus, in the first preferred embodiment of the present invention, which is in the state in which the reading unit of which is in its third position.

Hereinafter, the preferred embodiment of the present invention will be concretely described with reference to the appended drawing. If a given component in one of the drawings is designated with the same referential symbol as the one used in another drawing to designate a component, the two components correspond to each other. FIG. 1 is a vertical sectional view of the image reading-recording apparatus, in the first preferred embodiment of the present invention, which is in the state in which the reading unit of which is in its first position. FIG. 2 is a vertical sectional view of the image reading-recording apparatus, shown in FIG. 1, which is in the state in which the reading unit of which is in its second position. FIG. 3 is a vertical sectional view of the image reading-recording apparatus, in FIG. 1, which is in the state in which the reading unit of which is in its third position. Referring to FIGS. 1-3, the image reading-recording apparatus is structured so that its reading unit 1, which is for reading an original, is movable relative to its recording unit 2, which is for recording an image on recording medium. More specifically, in this embodiment, the reading unit 1 is placed on the top side of the recording unit 2, and is horizontally movable relative to the recording unit 2.

Figure 4:
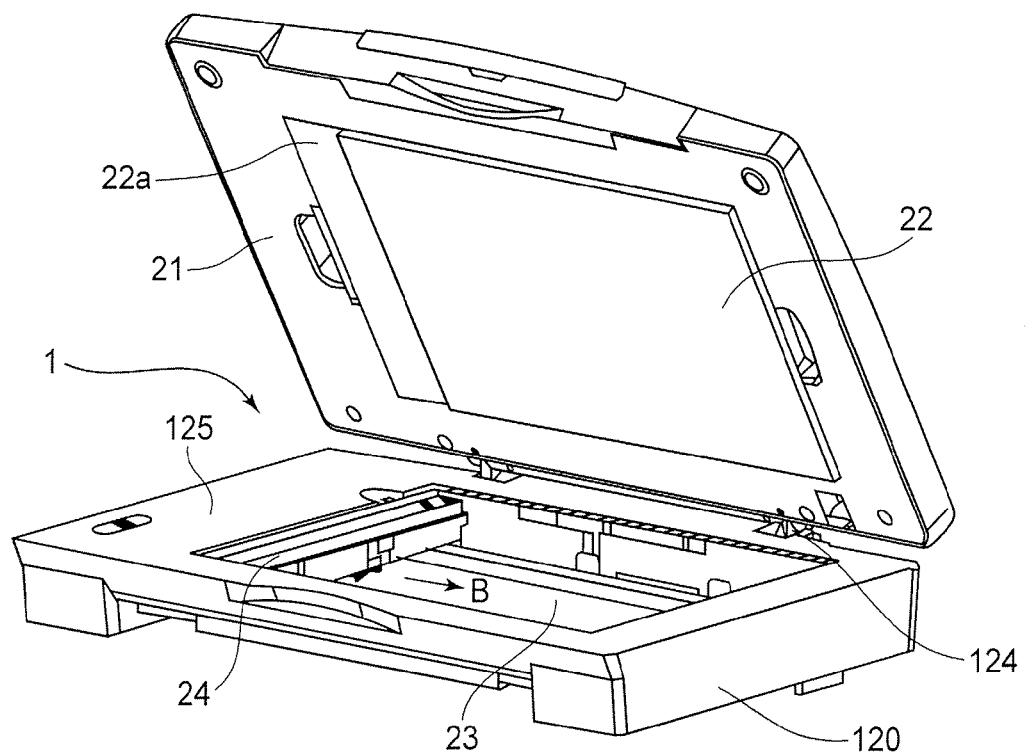
FIG. 4 is a perspective view of the reading unit which is ready for the placement of an original in the unit.

FIG. 4 is a perspective view of the reading unit, shown in FIG. 1, which is ready for the placement of an original in the unit. First, the reading unit 1 will be described. Referring to FIG. 1-4, the opening of the frame 120 of the reading unit 1 is fitted with a glass plate 23 (glass platen), on which an original is to be placed. The reading unit 1 is provided with a cover 125, which is fixed to the frame 120, and the glass platen 23 is held to the frame 120 by the cover 125, which presses on the top surface of the glass platen 23. The reading unit 1 is provided with a reading unit 24, which is disposed within the frame 120 to read an original on the glass platen 23, from the underside of the glass platen 23. The reading unit 24 is made up of a CCD. The reading unit 1 is also provided with a pressure plate 21, which is attached to the frame 120 with the use of a hinge 124, being enabled to opened or closed relative to the frame 120. FIG. 4 shows the reading unit 1 which is in the state in which its pressure plate 21 is open. The pressure plate 21 is for preventing the original on the glass platen 23, from becoming airborne. The pressure plate 21 is provided with a white sheet 22 and a sponge plate 22*a*, which are attached to the surface of the pressure plate 21. More specifically, the sponge plate 22*a* is attached to the pressure plate 21, and the white sheet 22 is attached to the sponge plate 22*a*, serving as the background for the original. After an original is set on the glass platen 23, the pressure plate 21 is closed. Then, as a read command is inputted from a PC or the like, the image on the original is read by the reading unit 24. More specifically, the reading unit 24 is driven so that it moves in the direction indicated by an arrow mark B in a manner to scan the original in order to read the original.

Figure 5:
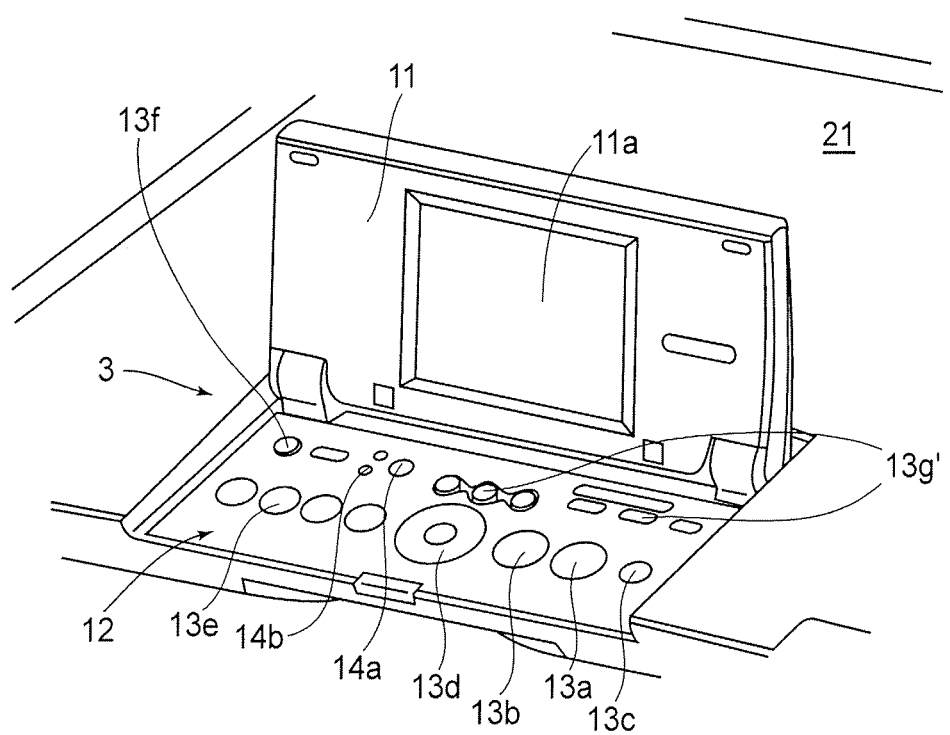
FIG. 5 is a perspective view of the control panel which is in use.

FIG. 5 is a perspective view of the control panel portion 3 which is in use. The control panel portion 3 is on the top front side of the reading unit 1. More concretely, the control panel portion 3 is on the top side of the pressure plate 21, that is, the opposite side of the pressure plate 21 from the white sheet 22, and on the front side of the pressure plate 21. FIG. 5 shows the control panel portion 3, which is in the state in which its LCD portion 11 is open, that is, the state in which the control panel portion 3 is operable. Next, the control panel portion 3 will be described. Referring to FIG. 5, the control panel portion 3 is provided with a control panel 12 having various keys arranged in a preset pattern. These keys will be described later. The abovementioned LCD portion 11 is rotationally attached to the pressure plate 21 so that the control panel 12 can be exposed or covered by rotationally moving the LCD portion 11. FIG. 5 shows the control panel portion 3, which is in the state in which the LCD portion 11 is in the upright position, exposing thereby the control panel 12. The LCD portion 11 is provided with an LDC monitor 11*a* which is visible to a user when the LCD portion 11 is in the open (upright) position. The control panel 12 is provided with a color recording start key 13*a*, a monochromatic recording start key 13*b*, a stop key 13*c*, a cross-patterned key 13*d*, a mode key 13*e*, a power key 13*f*, and a function key 13*g*. The control panel 12 is also provided with a sheet feeding portion selection key 14*a* and a sheet feeding portion selection indicator LED 14*b*.

As the sheet feeding portion selection key 14*a* is pressed, a switching is made between a first sheet feeding portion 50 and a second sheet feeding portion 80, with which the recording unit 2 is provided. The result of switching is indicated by the sheet feeding portion selection indicator LED 14*b*, making it possible to visually confirm the selection of the sheet feeding portion. The LCD portion 11 contains an LCD module (unshown) and a circuit board (unshown), which are attached to the back surface of the LCD screen which is made up of transparent members.

Next, referring to FIGS. 1-3, the recording unit 2 will be described. The recording unit 2 is provided with two sheet feeding portions, that is, the first sheet feeding portion 50, which feeds recording medium, such as recording paper, from the direction indicated by an arrow mark C (FIG. 2), and the second sheet feeding portion 80, which feeds recording medium from the direction indicated by an arrow mark D (FIG. 2). The first sheet feeding portion 50 is on the reading unit side of the recording unit 2. The second sheet feeding unit 80 is positioned so that it does not interfere with the operation of the reading unit 1.

The first sheet feeding portion 50 is structured so that sheets of recording medium are placed in layers in a sheet feeding tray 51, which extends (or is pulled out) from within the recording unit, diagonally upward relative to the top surface of the recording unit 2. The sheets of recording medium in the sheet feeding tray 51 are fed into a recording portion 60 through a sheet feeding opening 52, with which the top wall of the recording unit 2 is provided.

Referring to FIG. 2, the sheets of recording medium in the first sheet feeding portion 50 are fed into the recording portion 60 in the following manner: As a middle plate 36 is pressed upward by an unshown cam, the sheets of recording medium in the sheet feeding tray 51 are pressed against a sheet feeding roller 34. Then, the sheet feeding roller 34 is driven to start feeding the sheets of recording medium into the recording unit 2. More specifically, as the sheet feeding roller 34 is driven, the sheets of recording medium are conveyed in the direction indicated by the arrow mark C, while being separated one by one by the function of a separation roller 35 which is kept pressed against the sheet feeding roller 34, with the presence of sheet(s) of recording medium between the two rollers 34 and 35. Of the two rollers 34 and 35 which make up this sheet separating mechanism, the one which is actually rotationally driven is the sheet feeding roller 34. The separation roller 35 rotates only when it is subjected to such torque that is greater in strength than a preset value and acts in the same direction as the direction in which the separation roller 35 is rotatable. In other words, the amount of torque necessary to rotate the separation roller 35 is set so that the amount of torque necessary to rotate the separation roller 35 when two or more sheets of recording medium are in the nip between the two rollers 34 and 35, is greater than the amount of force necessary to convey the sheets of recording medium while separating them one by one. With the employment of this setup, the sheets of recording medium are fed into the recording unit 2, while being separated one by one, and are conveyed one by one into the recording portion 60. The sheets of recording medium, which were not conveyed into the recording unit 2, are returned by a return lever or the like, to where they were before they were moved toward the recording unit 2.

Each sheet of recording medium, which was separated from the rest, by the combination of the sheet feeding roller 34 and separation roller 35, is sent by the sheet feeding roller 34 to the nip between a sheet conveying roller 37*a* and a pinch roller 37*b*. Thereafter, the recording medium is conveyed by rotationally driving the sheet conveying roller 37*a*, to the recording start position, in which the recording medium opposes the recording head 55 of the recording portion 60. In this embodiment, the recording head 55 is mounted on a carriage 57, which is supported by a guide shaft 134, which extends in the direction perpendicular to the recording medium conveyance direction. The carriage 57 is supported by the guide shaft 134 in such a manner that it can be reciprocally movable along the guide shaft 134. As a recording operation start command is inputted, the operation for moving the recording head 55 in the primary scan direction while recording a section of an image, which corresponds to the recording width of the recording head 55 in terms of the recording medium conveyance direction, and the operation for conveying the recording medium with a preset pitch, are alternately repeated, until the entirety of the image is recorded on the recording medium. After the completion of the recording of the image on the recording medium, the recording medium is discharged from the main assembly of the image reading-recording apparatus, into a delivery tray 131, by the sheet conveying roller 37*a* and a pair of discharge rollers 130, through the nip which a pair of discharge rollers 130 form, and the nip which a spur gear (unshown) and its counterpart form. The recording unit 2 in this embodiment is an ink jet recording unit, which records an image on recording medium by jetting ink onto the recording medium from its recording head 55. The recording method of the recording head 55 is such a recording method that forms an image by jetting ink droplets from the ink jetting orifices selected from among its multiple ink jetting orifices based on picture information.

Referring to FIGS. 1-3, the second sheet feeding portion 80 is located in the bottommost portion of the recording unit 2. It has a sheet feeding tray 81, which is removably mountable into the recording unit 2 from the front side of the unit 2. The sheet feeding tray 81 is structured so that multiple sheets of recording medium can be stacked in the tray 81. As the sheet feeding tray 81 is mounted into the recording unit 2, the sheets of recording medium in the tray 81 are pressed against a sheet feeding roller 40 by a leaf spring (unshown). As the sheet feeding roller 40 is rotationally driven, the sheets of recording medium in the tray 81 are conveyed in the direction indicated by the arrow mark D by the sheet feeding roller 40 while being separated one by one by a separation roller 41. Of the two rollers 40 and 41, which make up a separation mechanism, it is the sheet feeding roller 40 that is actually driven. That is, the separation roller 41 rotates only when the amount of torque to which it is subjected is greater than a preset value, and also, the direction of the torque is the same as the direction in which the separation roller 41 is rotatable. More specifically, the amount of torque necessary to rotate the separation roller 41 is set up so that the amount of torque necessary to rotate the separation roller 41 when two or more sheets of recording medium are in the nip between the two rollers 40 and 41, is greater than the amount of force necessary to convey the sheets of recording medium, while separating them. Therefore, the sheets of recording medium in the tray 81 can be conveyed into the recording portion 2 while being separated one by one from the rest. In this embodiment, as a sheet of recording medium is fed into the recording portion 2 from the second sheet feeding portion 80, it is conveyed through a U-turn section (which will be described later), being thereby turned over, and then, is conveyed to the nip between the sheet conveying roller 37a and pinch roller 37b.

That is, the U-turn section, which is the section of the recording medium passage, which is between the second sheet feeding portion 80 and the nip between the sheet conveying roller 37a and pinch roller 37b, is provided with intermediary rollers 42 and 44. After being fed into the recording portion 2 by the sheet feeding roller 40 and separation roller 41, each sheet of recording medium is conveyed through the nip between the intermediary roller 42 (which is being rotationally driven) and a pinch roller (unshown), and then, the nip between the intermediary roller 44 (which is being rotationally driven) and a pinch roller (unshown). Then, it is conveyed to the aforementioned nip between the sheet conveying roller 37a and pinch roller 37b. Then, the sheet of recording medium is conveyed by rotating the sheet conveying roller 37a to the aforementioned recording start position, in which it faces the recording head 55. The process which the sheet of recording medium is going to be subjected thereafter is the same as that to which the sheet of recording medium fed into the recording portion 2 from the sheet feeding portion 50 describe before, except that the first and second sheet feeding portions 50 and 80 are opposite in terms of the direction in which the surface of a sheet of recording medium, which is facing upward in the sheet feeding portions 50 and 80, faces upward in the recording portion 60.

The reading unit 1 is attached to the recording unit 2 so that it can be roughly horizontally moved along the top surface of the recording unit 2. It is provided with three positions, that is, the first position shown in FIG. 1, second position shown in FIG. 2, and third position shown in FIG. 3, in which it can be used. In other words, the reading unit 1 can be used in any of the three positions. When the recording unit 2 is in the first position shown in FIG. 1, the reading unit 1 and recording unit 2 are in the state of being in vertical alignment with each other; the entirety of the top surface of the recording unit 2 is perfectly covered with the entirety of the bottom surface of the reading unit 1. Thus, when the reading unit 1 is in the first position, the sheet feeding opening 52, which is in the rear portion of the top surface of the recording unit 2, remains covered with the reading unit 1, making it impossible for the sheet feeding tray 51, which is in the recording unit 2, to be extended in the diagonally upward direction. In other words, when the reading unit 1 is in the first position, recording medium cannot be placed in the sheet feeding tray 51, and therefore, the first sheet feeding portion 50 cannot be used; the sheet feeding tray 51 remains folded in the recording unit 2.

On the other hand, recording medium can be placed in the second sheet feeding portion 80 regardless of the position of the reading unit 1; the second sheet feeding portion 80 can always be used for feeding recording medium into the recording unit 2. In other words, when the reading unit 1 is in the position shown in FIG. 1, the first sheet feeding portion 50 cannot be used for an image forming operation, but, the second sheet feeding portion 80 can be used for an image forming operation. Further, when the reading unit 1 is in the first position, the reading unit 1 and recording unit 2 are roughly in the vertical alignment, with the sheet feeding tray 51 remaining folded in the recording unit 2. In other words, when the reading unit 1 is in the first position, the image reading-recording apparatus is smallest in the amount of space necessary for image recording operation.

The second position for the reading unit 1 is located horizontally frontward of the first position. Thus, as the reading unit 1 is moved into the second position, its front end portion protrudes beyond the front end of the recording unit 2, exposing thereby the sheet feeding opening 52, which opens at the top surface of the recording unit 2, on the rearward end side, allowing thereby the sheet feeding tray 51 to be upwardly pulled out to place recording medium in the sheet feeding tray 51. That is, as the reading unit 1 is moved into the second position, it becomes possible to use the sheet feeding tray 51 to feed recording medium into the recording unit 2 to form an image. In other words, when the reading unit 1 is in the second position, either of the first and second sheet feeding portions 50 and 80 can be selected for image formation.

The third position for the reading unit 1 is located horizontally rearward of the first position. Thus, as the reading unit 1 is moved into the third position, its rear end portion protrudes beyond the rear end of the recording unit 2, and a certain area of the front end portion of the top surface of the recording unit 2 is exposed, allowing a user to access the interior of the recording unit 2 through this area. Incidentally, even when the reading unit 1 is in the third position, more than half the top surface of the recording unit 2 remains covered by the reading unit 1. Further, the recording head 55 is located in a preselected area of the front portion of the interior of the recording unit 2. Further, the recording head 55 is a part of a replaceable ink jet recording head cartridge which is integral with an ink container, or is a recording head which is independent from an ink cartridge and is structured so that a replaceable ink container is removably attachable to the recording head. Therefore, providing the portion of the top wall of the recording unit 2, which corresponds to the area of the top surface of the recording unit 2, which becomes exposed as the reading unit 1 is moved to the third position, with an opening makes it easier to perform maintenance operations, such as replacing the recording head or ink container, or inspecting the recording portion 60. The recording unit 2 may be structured so that such an opening can be covered or exposed with a lid or the like.

Further, when the reading unit 1 is in the third position, the sheet feeding opening 52 which opens at the top surface of the recording unit 2 remains covered by the reading unit 1, and therefore, only the second sheet feeding portion of the two sheet feeding portions, that is, first and second sheet feeding portions 50 and 80, can be used. Concerning the availability of the two sheet feeding portions 50 and 80, the third position is the same as the first position. That is, when the reading unit 1 is in the third position, not only does the sheet feeding opening 52 remain covered, but also, the sheet feeding tray 51 cannot be pulled out. Therefore, not only is it impossible to place recording medium in the first sheet feeding portion 50, but also, it is impossible to feed recording medium out of the first sheet feeding portion 50. As for the second sheet feeding portion 80, it can be used regardless of the position of the reading unit 1. That is, even when the reading unit 1 is in the third position, recording medium can be placed in the sheet feeding portion 80, and can be fed out therefrom.

According to the preferred embodiment described above, the amount of space necessary to read an original, and the amount of space necessary to record an image using the second sheet feeding portion, can be minimized simply by selecting a specific recording unit position. Further, it is possible to provide an image reading-recording apparatus which is superior in operability in terms of ordinary operations to an image reading-recording apparatus in accordance with the prior art. That is, it is possible to provide an image reading-recording apparatus, the sheet feeding portion of which can be stored in the recording unit of the apparatus to keep the apparatus in the state in which it is smallest in the amount of space required by the apparatus when the sheet feeding portion is not used, for example when the apparatus is used only for reading an original. Further, even when using the recording unit 2, the amount of space which the image reading-recording apparatus requires can be minimized by using the second sheet feeding portion.

Also in the preferred embodiment described above, the reading unit 1 was horizontally movable. However, this embodiment is not intended to limit the present invention in scope. That is, the positioning and/or structure of the recording unit 2 may be changed so that the reading unit can be diagonally or vertically moved; the present invention is compatible with such positioning of the recording unit 2 and structural arrangement for the recording unit 2, just as effectively as it is to the positioning of the recording unit 2 and structural arrangement for the recording unit 2 in the preferred embodiment.

Figure 6:
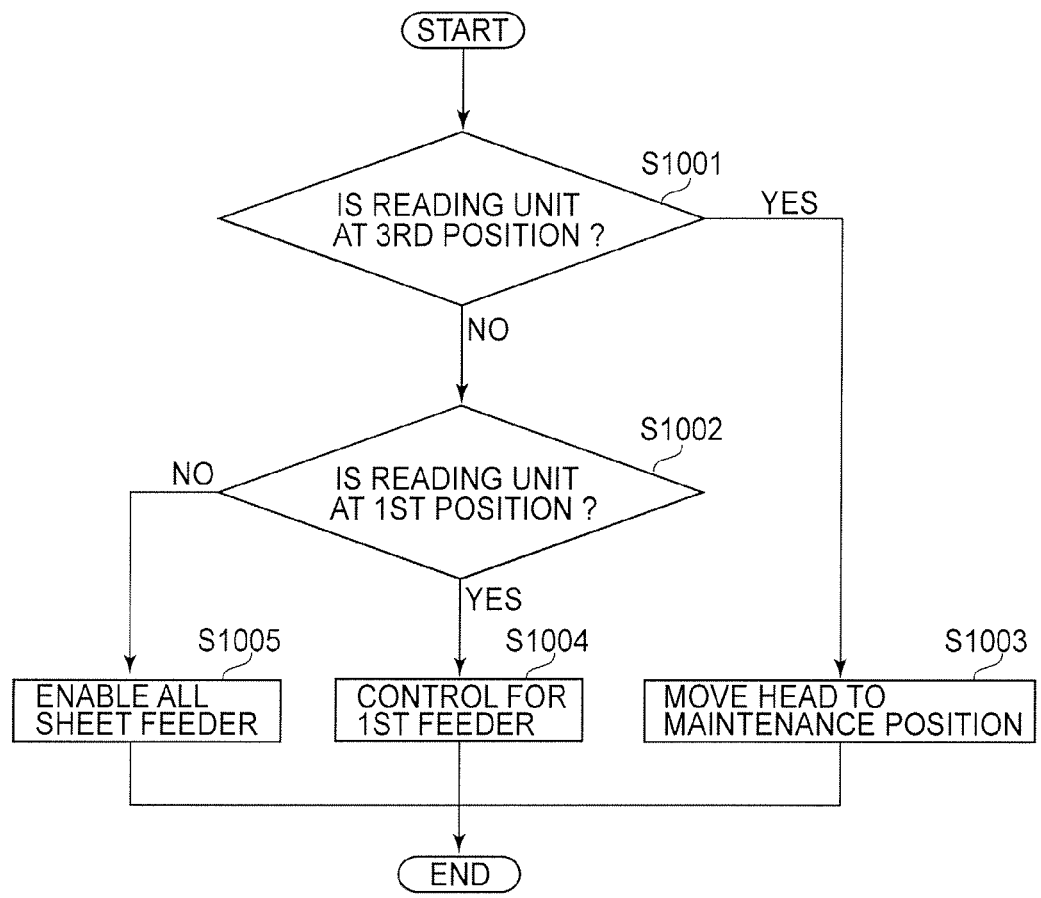
FIG. 6 is a flowchart of the operational sequence for controlling the reading unit of the image reading-recording apparatus, based on the reading unit position, in the first preferred embodiment of the present invention.

FIG. 6 is a flowchart of the operational sequence of the image reading-recording apparatus in accordance with the present invention. In the case of the image reading-recording apparatus in the preferred embodiment of the present invention described above, the position of the reading unit 1 relative to the top surface of the recording unit 2 is detected by a sensor. Further, the apparatus is provided with a controlling means which automates the process of selecting the sheet feeding portion of the recording unit 2, process of moving the reading unit 1 to the maintenance position, that is, the position for replacing the recording head and/or ink container, and/or performing the maintenance inspection, etc., and the like processes. FIG. 6 shows the flowchart of the operational sequence carried out by this controlling means. The control sequence in accordance with the flowchart in FIG. 6 starts as the position of the reading unit 1 changes. Referring to FIG. 6, in Step S1001, it is determined whether or not the reading unit 1 is in the third position (FIG. 3). If it is determined that the reading unit 1 is in the third position, Step S1003 is taken, in which the carriage 57 is moved to the maintenance position where the maintenance operations, such as inspecting the recording head 55 and/or replacing an ink container, are carried out by a user as necessary.

If it is determined in Step S1001 that the reading unit 1 is not in the third position, Step S1002 is taken, in which it is determined whether or not the reading unit 1 is in the first position (FIG. 1). If it is determined that the reading unit 1 is in the first position, Step S1004 is taken, in which the control for inhibiting the usage of the first sheet feeding portion 50 is carried out, because when the reading unit 1 is in the first position, the sheet feeding opening 52 is covered. Regarding this control, if the sheet feeding portion selection indicator LED 14b is indicating the selection of the first sheet feeding portion 50, a control is executed to make the LED 14b indicate the second sheet feeding portion 80 as the sheet feeding portion choice. Further, an exclusion control is executed so that even if the sheet feeding portion selection key 14a is pressed down, the sheet feeding portion selection indicator LED 14b will not switch, and also, so that the message that the sheet feeding portion cannot be switched is displayed on the LCD portion 11; the exclusion control makes only the second sheet feeding portion 80 available for sheet feeding.

On the other hand, if it is determined in Step S1002 that the reading unit 1 is not in the first position, it is determined that the reading unit 1 is in the second position (FIG. 2). In this case, Step S1005 is taken, in which both the first and second sheet feeding portions 50 and 80 are set for sheet feeding. Then, the control sequence is ended. Incidentally, the control sequence described above is the same as the one to be followed when an image is formed based on the picture information supplied by a PC. The employment of a control sequence, such as the above described one, can automate the process of switching the sheet feeding portion and the process of selecting maintenance options, reducing thereby operational errors. In other words, according to the above described preferred embodiment of the present invention, the amount of the space which the image reading-recording apparatus requires when it forms an image using the second sheet feeding portion can be minimized simply by selecting a specific position for the reading unit 1, as described above. Further, not only can the image reading-recording apparatus be minimized in the amount of space required for image formation, but also, the process of switching the sheet feeding portions and the process of selecting maintenance options can be automated, further improving the image reading-recording apparatus in operability in terms of the ordinary operations.

In the case of the preferred embodiment described above, the recording unit 2 was of the serial type, that is, the type which records an image on recording medium by moving the recording head 55 along the recording medium. However, the present invention is also applicable to a recording unit of the line type, that is, the type which employs a recording head capable of recording all at once across the entirety of the recordable range of recording medium in terms of the direction perpendicular to the recording medium conveyance direction so that an image can be recorded simply by moving the recording head relative to recording medium in the recording medium conveyance direction in a manner to scan the recording medium. Further, regarding the recording method which the recording unit 2 employs, not only is the present invention compatible with the ink jet recording method, but also, the laser beam recording method, thermal transfer recording method, thermal recording method, wire dot recording method, etc. That is, the present invention is applicable to an image reading-recording apparatus regardless of the recording method employed by the recording unit of the apparatus. Moreover, the present invention is applicable to an image reading-recording apparatus regardless of the recording head count and positioning, just as effectively as it is to the image reading-recording apparatus in the preceding embodiment.

According to the present invention, it is possible to provide an image reading-recording apparatus which is substantially smaller, in the amount of space required for its recording operation, and better in the operability in terms of the ordinary operations, than an image reading-recording apparatus in accordance with the prior art.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 160715/2006 filed Jun. 9, 2006 which is hereby incorporated by reference.

What is claimed is:

1. An image reading recording apparatus comprising:
a recording unit for recording an image on a sheet, the recording unit including a feeding port for feeding the sheet; and
a read unit, including a frame and a reading portion which movably scans in the frame to read an original,
wherein the read unit is movable relative to the recording unit between a first position where the feeding port of the recording unit is closed by the frame, and a second position where the feeding port is not closed by the frame,
wherein the recording unit includes a first sheet feeder disposed in a side of the read unit, for feeding the sheet, and when the read unit is in the first position, sheet feeding from the first sheet feeder is prohibited, and
wherein the recording unit includes a second sheet feeder, and when the read unit is in the first position, the sheet is fed from the second sheet feeder.

2. The apparatus according to claim 1, wherein when the read unit is in the second position, the sheet can be fed selectively from the first sheet feeder or the second sheet feeder.

3. The apparatus according to claim 1, wherein it is detectable whether the read unit is in the first position or the second position.

4. An image reading recording apparatus, comprising:
a recording unit for recording an image on a sheet, the recording unit including a feeding port for feeding the sheet; and
a read unit, including a frame and a reading portion which movably scans in the frame to read an original,
wherein the read unit is movable relative to the recording unit between a first position where the feeding port of the recording unit is closed by the frame, and a second position where the feeding port is not closed by the frame,
wherein the read unit is movable to a third position where a maintenance operation of the recording unit is possible from a read unit side.

5. The apparatus according to claim 4, wherein the recording unit is effective to eject the ink from a recording head onto the sheet to effect the recording.

6. An image reading recording apparatus, comprising:
a recording unit for recording an image on a sheet, the recording unit including a feeding port for feeding the sheet; and
a read unit, including a frame and a reading portion which movably scans in the frame to read an original,
wherein the read unit is movable relative to the recording unit between a first position where the feeding port of the recording unit is closed by the frame, and a second position where the feeding port is not closed by the frame,
wherein the read unit is disposed on top of the recording unit, and is movable in a horizontal direction relative to the recording unit.

7. An image reading recording apparatus, comprising:
a recording unit for recording an image on a sheet, the recording unit including a feeding port for feeding the sheet; and
a read unit, including a frame and a reading portion which movably scans in the frame to read an original,
wherein the read unit is movable relative to the recording unit between a first position where the feeding port of the recording unit is closed by the frame, and a second position where the feeding port is not closed by the frame,
wherein when the read unit is in the first position, the read unit physically covers the feeding port.

8. The apparatus according to claim 7, wherein the read unit is disposed on top of the recording unit, and is movable in a horizontal direction relative to the recording unit between the first position and the second position.

9. The apparatus according to claim 7, wherein the read unit is movable to a third position where a maintenance operation of the recording unit is possible from a read unit side.

* * * * *